(12) United States Patent
Lake

(10) Patent No.: US 6,471,129 B2
(45) Date of Patent: Oct. 29, 2002

(54) METHOD OF FABRICATING A REMOTE INTELLIGENT COMMUNICATIONS DEVICE

(75) Inventor: Rickie C. Lake, Eagle, ID (US)

(73) Assignee: Micron Technology, Inc., Boise, ID (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/383,589

(22) Filed: Aug. 26, 1999

(65) Prior Publication Data

US 2002/0030111 A1 Mar. 14, 2002

Related U.S. Application Data

(62) Division of application No. 08/953,030, filed on Oct. 17, 1997, now Pat. No. 6,089,458.

(51) Int. Cl.$^7$ ............................................. G06K 19/06
(52) U.S. Cl. ........................ 235/491; 235/492; 235/441
(58) Field of Search ................................. 235/492, 491, 235/441; 343/872

(56) References Cited

U.S. PATENT DOCUMENTS

| | | | | |
|---|---|---|---|---|
| 4,900,286 A | | 2/1990 | Buffalo ........................ 446/30 |
| 4,906,988 A | | 3/1990 | Copella ....................... 340/825 |
| 5,055,968 A | * | 10/1991 | Nishi et al. .................. 235/380 |
| 5,206,495 A | * | 4/1993 | Kreft ........................... 235/492 |
| 5,362,955 A | * | 11/1994 | Haghiri-Tehrani .......... 235/492 |
| 5,392,544 A | * | 2/1995 | Price ............................ 40/152 |
| 5,426,130 A | * | 6/1995 | Thurber et al. ............... 522/14 |
| 5,610,119 A | | 3/1997 | Ueno et al. .................. 503/227 |
| 5,700,697 A | * | 12/1997 | Dlugokecki ................... 437/8 |
| 5,710,458 A | * | 1/1998 | Iwasaki ....................... 235/491 |
| 5,763,356 A | | 6/1998 | Ueno et al. .................. 503/227 |
| 5,919,552 A | | 7/1999 | Malhotra .................... 428/195 |
| 5,963,177 A | * | 10/1999 | Tuttle et al. ................. 343/872 |
| 5,988,510 A | * | 11/1999 | Tuttle et al. ................. 235/492 |
| 6,073,856 A | * | 6/2000 | Takahashi .................... 235/492 |
| 6,097,100 A | * | 8/2000 | Eguchi et al. ............... 257/787 |
| 6,109,530 A | * | 8/2000 | Larson et al. ............... 235/492 |
| 2001/0040186 A1 | * | 11/2001 | Okada ......................... 235/492 |

FOREIGN PATENT DOCUMENTS

| JP | 4-103389 | * | 4/1992 |
|---|---|---|---|
| JP | 7-101186 | * | 4/1995 |
| JP | 11139054 | * | 5/1999 |
| JP | 2000059260 | * | 2/2000 |
| JP | 2000293651 | * | 10/2000 |
| JP | 2000-335145 | * | 12/2000 |

* cited by examiner

Primary Examiner—Thien M. Le
Assistant Examiner—Uyen-Chau N. Le
(74) Attorney, Agent, or Firm—Wells St. John P.S.

(57) ABSTRACT

A method of fabricating a remote intelligent communications device includes providing a substrate having conductive lines formed thereon. The conductive lines include an antenna. An integrated circuit chip and a battery are bonded to the conductive lines on the substrate. A liquid resin and a liquid hardener are provided. At least one of the liquid resin and the liquid hardener has a fluorescent material therein. The liquid resin and the liquid hardener are combined into a liquid epoxy mixture. Radiation is impinged onto the liquid epoxy mixture effective to cause the fluorescent material to fluoresce. From the fluorescing fluorescent material, degree of homogeneity in the liquid epoxy mixture is determined. Upon achieving desired homogeneity, the substrate with chip and battery is encapsulated in the liquid epoxy mixture. After encapsulating, the liquid epoxy mixture is cured into a solid mass.

16 Claims, 2 Drawing Sheets

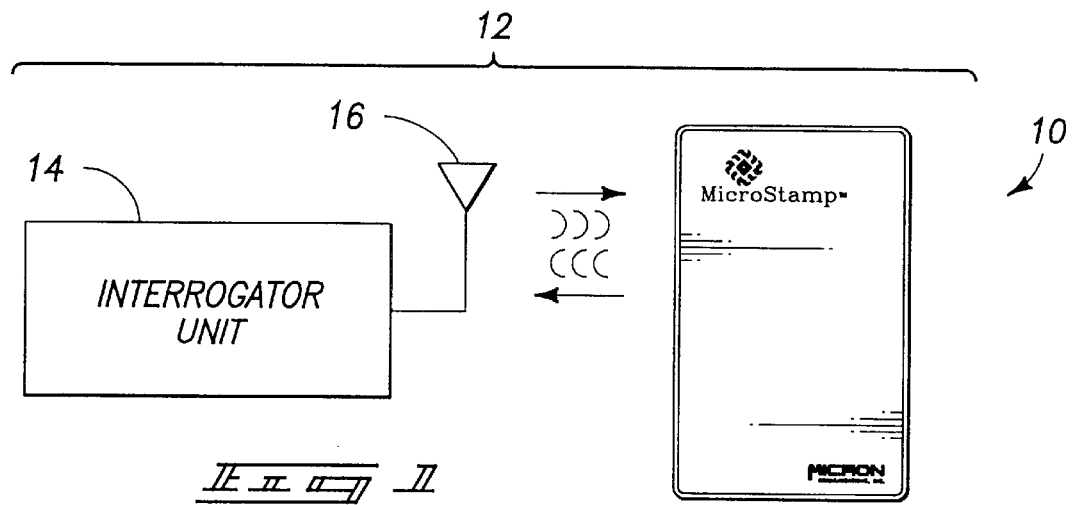
$\mathbb{F} \mathbb{I} \mathbb{F}$ $\mathbb{I}$
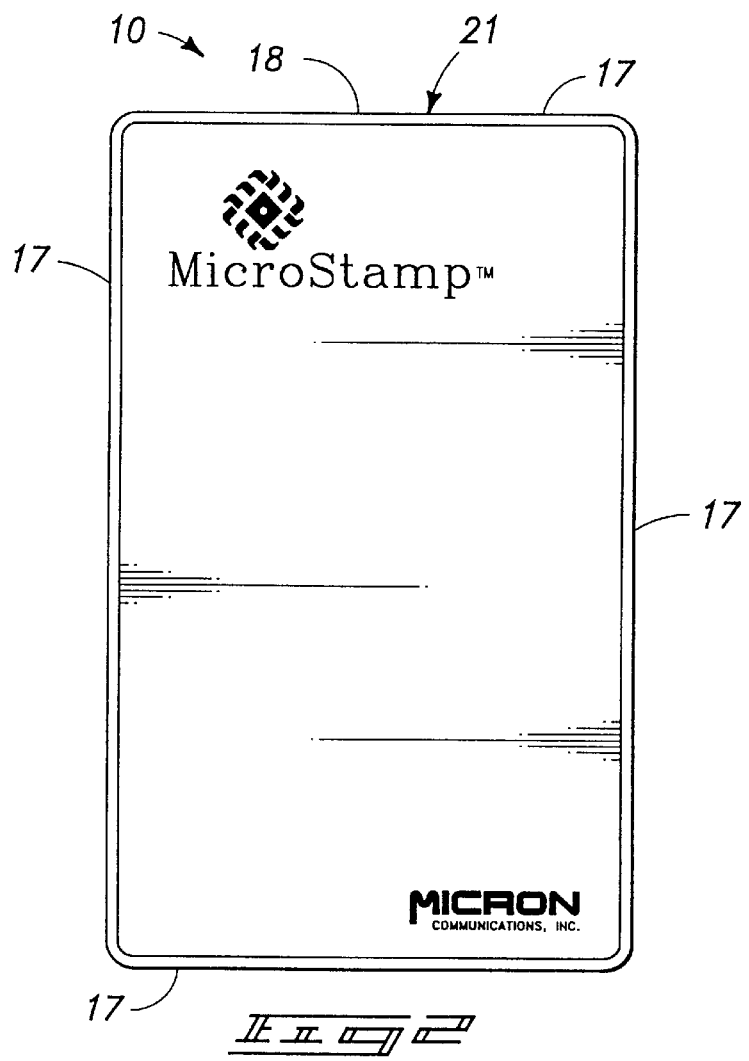
$\mathbb{F} \mathbb{I} \mathbb{F}$ $\mathbb{Z}$

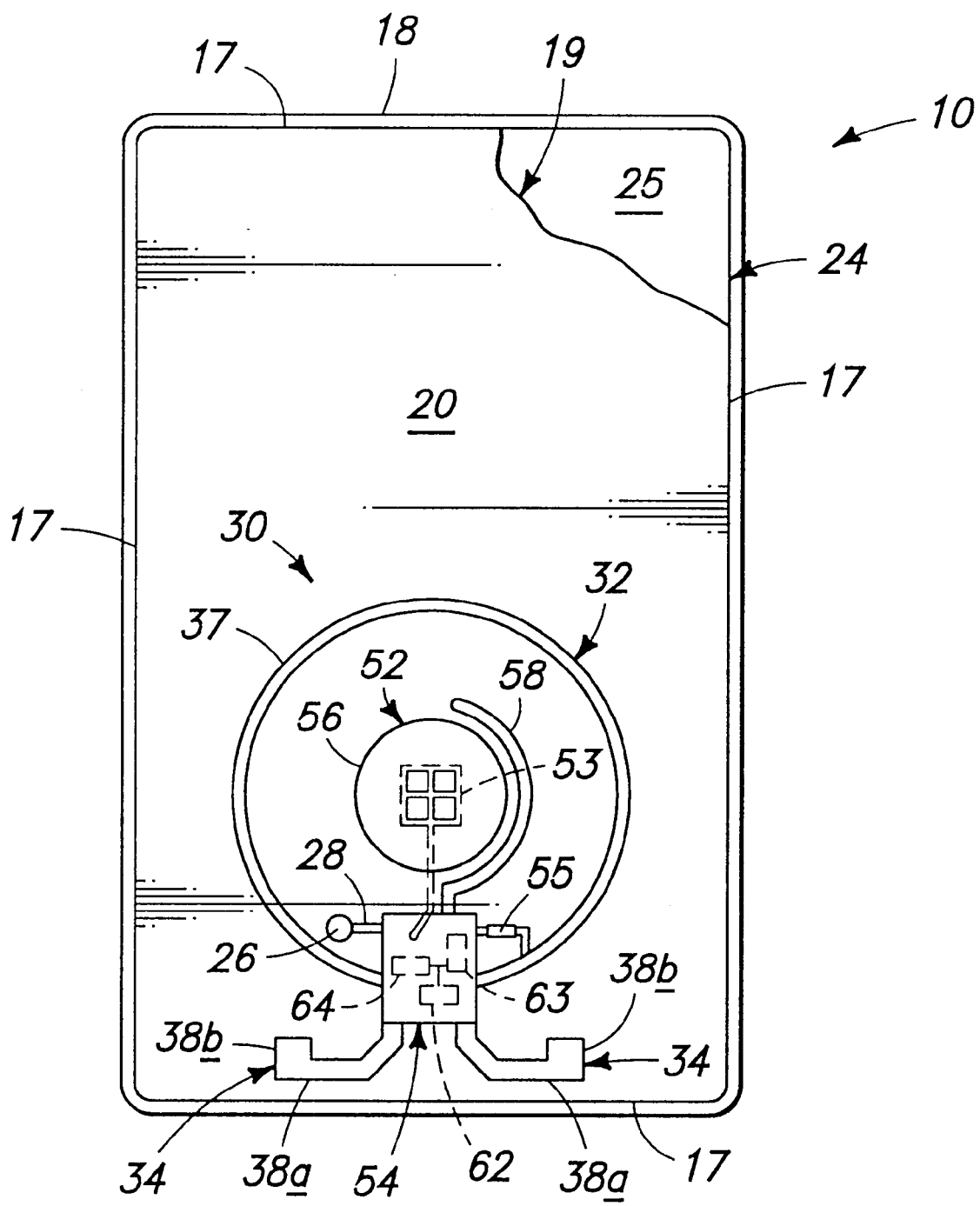

METHOD OF FABRICATING A REMOTE INTELLIGENT COMMUNICATIONS DEVICE

RELATED PATENT DATA

This patent resulted from a divisional application of U.S. patent application Ser. No. 08/953,030, filed Oct. 17, 1997, now U.S. Pat. No. 6,089,458 entitled "Methods of Processing Liquids, Epoxy Fabrication Method, Method of Fabricating a Radio Frequency Intelligent Communication Device, and Method Involving a Mixture of Different Liquids", naming Rickie C. Lake as inventor, the disclosure of which is incorporated by reference

TECHNICAL FIELD

This invention relates to methods of fabricating radio frequency remote intelligent communications devices. The invention has applicability to methods of processing liquids, epoxy fabrication methods and processes involving a mixture of different liquids.

BACKGROUND OF THE INVENTION

Electronic identification systems typically comprise two devices which are configured to communicate with one another. Preferred configurations of the electronic identification systems are operable to provide such communications via a wireless medium.

One such configuration is described in U.S. patent application Ser. No. 08/705,043, filed Aug. 29, 1996, assigned to the assignee of the present application and incorporated herein by reference. This application discloses the use of a radio frequency (RF) communication system including communication devices. The communication devices include an interrogator and a transponder such as a tag or card.

The communication system can be used in various identification and other applications. The interrogator is configured to output a polling signal which may comprise a radio frequency signal including a predefined code. The transponders of such a communication system are operable to transmit an identification signal responsive to receiving an appropriate command or polling signal. More specifically, the appropriate transponders are configured to recognize the predefined code. The transponders receiving the code subsequently output a particular identification signal which is associated with the transmitting transponder. Following transmission of the polling signal, the interrogator is configured to receive the identification signals enabling detection of the presence of corresponding transponders.

Such communication systems are useable in identification applications such as inventory or other object monitoring. For example, a remote identification device is attached to an object of interest. Responsive to receiving the appropriate polling signal, the identification device is equipped to output an identification signal. Generating the identification signal identifies the presence or location of the identification device and article or object attached thereto.

SUMMARY

In but one aspect, the invention comprises a method of fabricating a radio frequency intelligent communications device. A substrate is formed to have conductive lines, at least a portion of which comprise an antenna. An integrated circuit chip and a battery are conductively bonded to the conductive lines on the substrate. A visible spectrum colored liquid resin and a visible spectrum substantially colorless liquid hardener are combined into an epoxy mixture. The liquid hardener has a fluorescent material received therein. Radiation is impinged onto the epoxy mixture effective to cause the fluorescent material to fluoresce. From the fluorescing fluorescent material, degree of homogeneity in the epoxy mixture can be determined. Upon achieving desired homogeneity, the substrate with chip and battery are encapsulated in the epoxy mixture, with the epoxy mixture being cured.

The invention also has applicability to epoxy systems and other liquid mixtures having at least two liquid components. The invention also comprises providing first and second liquids where one of said liquids has an invisible component therein. The first and second liquids are combined together into a mixture. The invisible component remains invisible in the mixture upon the combining. After the combining, the component is rendered visible, for example by exposure to ultraviolet radiation. Degree of homogeneity in the mixture is determined while the component has been rendered visible. After the determining, the component is rendered invisible, for example by removing the ultraviolet light source.

BRIEF DESCRIPTION OF THE DRAWINGS

Preferred embodiments of the invention are described below with reference to the following accompanying drawings.

FIG. 1 is a block diagram of a wireless communication system including an interrogator and a wireless communication device embodying the invention.

FIG. 2 is a front elevational view of the wireless communication device.

FIG. 3 is a front elevational view of the wireless communication device at an intermediate processing step.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

This description of the present invention discloses embodiments of various wireless communication devices. The wireless communication devices are fabricated in card configurations (which include tags or stamps) according to some aspects of the present invention. Certain embodiments of invention are methods for producing wireless communication devices such and remote intelligent communication devices (RIC) including radio frequency identification devices (RFID). The embodiments are illustrative only and other configurations in accordance with the invention are of course possible, with the invention only being limited by the accompanying claims appropriately interpreted in accordance with the Doctrine Of Equivalents.

Referring to FIG. 1, a remote intelligent communication device or wireless communication device 10 comprises part of a communication system 12. The remote intelligent communication device is capable of functions other than the identifying function of a radio frequency identification device. A preferred embodiment of the remote intelligent communication device includes a processor.

The communication system 12 includes an interrogator unit 14. An exemplary interrogator 14 is described in U.S. patent application Ser. No. 08/806,158, filed Feb. 25, 1997, assigned to the assignee of the present application and incorporated herein by reference. The wireless communication device 10 communicates via wireless electronic signals, such as radio frequency (RF) signals, with the interrogator unit 14. Radio frequency signals including microwave signals are utilized for communications in a preferred embodiment of communication system 12. The communication system 12 includes an antenna 16 coupled to the interrogator unit 14.

Referring to FIG. 2, the wireless communication device 10 includes an insulative substrate or layer of supportive material 18. The term "substrate" as used herein refers to any supporting or supportive structure, including but not limited to, a supportive single layer of material or multiple layer constructions. Example materials for the substrate 18 comprise polyester, polyethylene or polyimide film having a thickness of 3–10 mils (thousandths of an inch).

Substrate 18 provides a first or lower portion of a housing for the wireless communication device 10 and defines an outer periphery 21 of the device 10. Substrate 18 includes a plurality of peripheral edges 17.

Referring to FIG. 3, at least one ink layer 19 is applied to substrate 18 in preferred embodiments of the invention. Ink layer 19 enhances the appearance of the device 10 and conceals internal components and circuitry provided therein. A portion of ink layer 19 has been peeled away in FIG. 3 to reveal a portion of an upper surface 25 of substrate 18. In other embodiments, plural ink layers are provided upon upper surface 25.

A support surface 20 is provided to support components and circuitry formed in later processing steps upon substrate 18. In embodiments wherein at least one ink layer 19 is provided, support surface 20 comprises an upper surface thereof as shown in FIG. 3. Alternatively, upper surface 25 of substrate 18 operates as the support surface if ink is not applied to substrate 18.

A patterned conductive trace 30 is formed or applied over the substrate 18 and atop the support surface 20. Conductive trace 30 is formed upon ink layer 19, if present, or upon substrate 18 if no ink layer is provided. A preferred conductive trace 30 comprises printed thick film (PTF). The printed thick film comprises silver and polyester dissolved into a solvent. One manner of forming or applying the conductive trace 30 is to screen or stencil print the ink on the support surface 20 through conventional screen printing techniques. The printed thick film is preferably heat cured to flash off the solvent and UV cured to react UV materials present in the printed thick film.

The conductive trace 30 forms desired electrical connections with and between electronic components which will be described below. In one embodiment, substrate 18 forms a portion of a larger roll of polyester film material used to manufacture multiple devices 10. In such an embodiment, the printing of conductive trace 30 can take place simultaneously for a number of the to-be-formed wireless communication devices.

The illustrated conductive trace 30 includes conductive lines and patterns, such as an electrical connection 28, a first connection terminal 53 (shown in phantom in FIG. 3) and a second connection terminal 58. Conductive trace 30 additionally defines transmit and receive antennas 32, 34 in one embodiment of the invention. Antennas 32, 34 are suitable for respectively transmitting and receiving wireless signals or RF energy. Transmit antenna 32 constitutes a loop antenna having outer peripheral edges 37. Receive antenna 34 constitutes two elongated portions individually having horizontal peripheral edges 38a, which extend in opposing directions, and substantially parallel vertical peripheral edges 38b.

Other antenna constructions are of course possible. In particular, both transmit and receive operations are implemented with a single antenna in alternative embodiments of the present invention. Both antennas 32, 34 preferably extend or lie within the confines of peripheral edges 17 and outer periphery 21 and define a plane (shown in FIG. 4).

One embodiment of a wireless communication device 10 includes a power source 52, an integrated circuit chip 54, and capacitor 55. Power source 52, capacitor 55, and integrated circuit chip 54 are provided and mounted on support surface 20 and supported by substrate 18. The depicted power source 52 is disposed within transmit antenna 32 of wireless communication device 10. Capacitor 55 is electrically coupled with loop antenna 32 and integrated circuit 54 in the illustrated embodiment.

Power source 52 provides operational power to the wireless communication device 10 and selected components therein, including integrated circuit 54. In the illustrated embodiment, power source 52 comprises a battery. In particular, power source 52 is preferably a thin profile battery which includes first and second terminals of opposite polarity. More particularly, the battery has a lid or negative (i.e., ground) terminal or electrode, and a can or positive (i.e., power) terminal or electrode.

Conductive epoxy is applied over desired areas of support surface 20 using conventional printing techniques, such as stencil or screen printing, to assist in component attachment described just below. Alternately, solder or another conductive material is employed instead of conductive epoxy. The power source 52 is provided and mounted on support surface 20 using the conductive epoxy. Integrated circuit 54 and capacitor 55 are also provided and mounted or conductively bonded on the support surface 20 using the conductive epoxy. Integrated circuit 54 can be mounted either before or after the power source 52 is mounted on the support surface 20.

Integrated circuit chip 54 includes suitable circuitry for providing wireless communications. For example, in one embodiment, integrated circuit chip 54 includes a processor 62, memory 63, and wireless communication circuitry or transponder circuitry 64 (components 62, 63, 64 are shown in phantom in FIG. 3) for providing wireless communications with interrogator unit 14. An exemplary and preferred integrated circuit 54 is described in U.S. patent application Ser. No. 08/705,043, incorporated by reference above.

One embodiment of transponder circuitry 64 includes a transmitter and a receiver respectively operable to transmit and receive wireless electronic signals. In particular, transponder circuitry 64 is operable to transmit an identification signal responsive to receiving a polling signal from interrogator 14. In the described embodiment, processor 62 is configured to process the received polling signal to detect a predefined code within the polling signal. Responsive to the detection of an appropriate polling signal, processor 62 instructs transponder circuitry 64 to output an identification signal. The identification signal contains an appropriate code to identify the particular device 10 transmitting the identification signal in certain embodiments. The identification and polling signals are respectively transmitted and received via antennas 32, 34 of the device 10.

First and second connection terminals 53, 58 are coupled to the integrated circuit 54 by conductive epoxy in accordance with a preferred embodiment of the invention. The conductive epoxy also electrically connects the first terminal of the power source 52 to the first connection terminal 53. In the illustrated embodiment, power source 52 is placed lid down such that the conductive epoxy makes electrical contact between the negative terminal of the power source 52 and the first connection terminal 53.

Power source 52 has a perimetral edge 56, defining the second power source terminal, which is provided adjacent second connection terminal 58. In the illustrated embodiment, perimetral edge 56 of the power source 52 is cylindrical, and the connection terminal 58 is arcuate and has a radius slightly greater than the radius of the power source 52, so that connection terminal 58 is closely spaced apart from the edge 56 of power source 52.

Subsequently, conductive epoxy is dispensed relative to perimetral edge 56 and electrically connects perimetral edge 56 with connection terminal 58. In the illustrated embodiment, perimetral edge 56 defines the can of the power source 52. The conductive epoxy connects the positive terminal of the power source 52 to connection terminal 58. The conductive epoxy is then cured. Thus, the integrated circuit and battery are conductively bonded relative to the substrate and to the conductive lines of trace 30.

An encapsulant, such as encapsulating epoxy material, is subsequently formed following component attachment. In one embodiment, the encapsulant is provided over the entire support Surface 20. Such encapsulates or envelopes the antennas 32, 34, integrated circuit 54, power source 52, conductive circuitry 30, capacitor 55, and at least a portion of the support surface 20 of substrate 18. Such operates to insulate and protect the components (i.e., antennas 32, 34, integrated circuit 54, power source 52, conductive circuitry 30 and capacitor 55).

An exemplary encapsulant is a flowable encapsulant. The flowable encapsulant is applied over substrate 18 and subsequently cured following the appropriate covering of the desired components. In the preferred embodiment, such encapsulant constitutes a two-part epoxy perhaps including fillers such as silicon and calcium carbonate. The preferred two-part epoxy is sufficient to provide a desired degree of flexible rigidity. Such encapsulation of wireless communication device 10 is described in U.S. patent application Ser. No. 08/800,037, filed Feb. 13, 1997, assigned to the assignee of the present application, and incorporated herein by reference. Other encapsulant materials of insulative layer 60 can be used in accordance with the present invention. Encapsulation would preferably occur from fabrication of multiple device patterns 10 formed on a single substrate sheet, and then cutting individual devices 10 from the sheet after encapsulation and cure.

Fabrication of the epoxy encapsulant material presents some challenges. Specifically, the preferred epoxy comprises a two-component system having a liquid resin material and a liquid hardener material. A presently preferred resultant color for the cured encapsulant is light grey. The resin typically constitutes three times the volume of the hardener within the liquid mixture from which the two-part system cures. In the preferred embodiment, the liquid resin is fabricated to be grey in color in light within the visible electromagnetic radiation spectrum. The hardener is clear or colorless in light within the visible spectrum. It is highly desirable that adequate and complete mixing of the resin/hardener two-component epoxy system occur prior to dispensing or otherwise providing the liquid encapsulant atop the substrate, chip, and battery. This is difficult to discern visually where one of the liquid mixing components is clear and the other is not.

A color-changing phenomenon might be utilized, but may also adversely affect the desired finished color of the product. For example, consider provision of a yellowish-colored hardener and a bluish-colored resin. The combination of these two natural colors produces green. Complete homogeneity in the mix of two such components could be determined quite easily visually by verifying uniform green coloring throughout the mix. However where the desired finished product is to be some color other than green, an obviously less than desirable result occurs.

In accordance with one aspect of the invention, at least one of the liquid resin and the liquid hardener is provided to have a fluorescent material therein. An example would be any of the T-700 Series, T-1020 Series, T-100-OS Series aqueous or oil soluble fluorescent tracers available from Shannon Luminous Materials, Inc., of Santa Ana, Calif. Such materials are understood to have been utilized in the prior art as additives to liquid coatings to assure complete coating of substrate covered by the coating. Preferably, the other of the liquid resin or liquid hardener is provided to have no fluorescent material therein, or less preferably have some other distinguishing fluorescent material therein.

The liquid resin and the liquid hardener are then combined into an epoxy mixture, and ideally stirred to achieve desired complete mixing. Thereafter or during mixing, radiation of suitable wave length is impinged onto the epoxy mixture effective to cause the fluorescent material to fluoresce. From the fluorescing fluorescent material, degree of homogeneity in the epoxy mixture can be determined. Such determination could occur simply by the human eye, or by more automated spectrographic means. For example, where the fluorescing material was fluorescent in ultraviolet light, ultraviolet radiation could be impinged upon the mixture with the results being viewed by a human eye. If the mixture glowed uniformly throughout, complete mixing has occurred such that the mixture is substantially homogenous. If on the other hand the mixture has specs or streaks of fluorescence and lack of fluorescence or uniform fluorescence, such would evidence that complete mixing has not yet occurred. Such can also be used to determine if the hardener has even been added to the mixture.

In the preferred embodiment, the fluorescent material is preferably placed within the hardener, which is also the lower volume component of the mixture and also in this embodiment a component which is colorless in light within the visible spectrum or substantially clear. Also preferably, the liquid resin is provided to be substantially void of any fluorescent material. Ideally, the epoxy mixture has substantially the same color and light within the visible spectrum as would exist if the fluorescent material, when not fluorescing, were not present in the epoxy mixture.

Once desired homogeneity was achieved as evidenced by examination of the fluorescent material, the substrate with chip and battery would be encapsulated within the epoxy mixture. After such encapsulating, the epoxy mixture would then essentially cure into a solidified mass.

Although specifically motivated for epoxy fabrication methods, and for use of such methods in remote intelligent communication devices, the invention is believed to have applicability in other methods of processing liquid mixtures comprising at least two different liquids. For example, the invention is seen to have applicability for any two mixture combinations of two liquids whereby a fluorescent material is provided into at least one of the liquids prior to combination with a second liquid to form a mixture. Degree of homogeneity in the mixture can be determined qualitatively or quantitatively by causing the fluorescent material to fluoresce and analyzing its presence throughout the mixture.

Preferably, where the volume of liquids within the mixture is different, the fluorescent material is provided in the lower volume component.

Liquid mixture systems involving three or more different liquids could of course also be utilized in combination with a fluorescent material in preferably only one of the liquids to determine a degree of homogeneity in a resultant mixture of such liquids.

In accordance with the above-described preferred embodiments, the fluorescent material ideally comprises an invisible component which is provided in at least one of the first and second liquids. Such component ideally remains invisible in a mixture of the liquids. After forming the mixture, the invisible component in the mixture is rendered visible, in the above example by impinging ultraviolet radiation, and the degree of homogeneity in the mixture is determined therefrom. After such determination, and if desired further mixing, the invisible component is returned to its invisible state, in the above example, by removing the impinging radiation source. Thus, resultant color in the finished and solidified product is not impacted by the component from which homogeneity is determined.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of fabricating a remote intelligent communications device comprising:
   providing a substrate having conductive lines formed thereon, the conductive lines comprising an antenna;
   conductively bonding an integrated circuit chip and a battery to the conductive lines on the substrate;
   providing a visible spectrum colored liquid resin and a visible spectrum substantially colorless liquid hardener, the liquid hardener having a visible spectrum colorless fluorescent material therein;
   combining and mixing the liquid resin and the liquid hardener into a liquid epoxy mixture having a volumetric ratio of resin to hardener of at least about 2, the liquid epoxy mixture not contacting the substrate during said combining and mixing;
   impinging radiation onto the liquid epoxy mixture effective to cause the fluorescent material within the liquid epoxy mixture to fluoresce within the liquid epoxy mixture, the liquid epoxy mixture not contacting the substrate during said impinging;
   from the fluorescing fluorescent material within the liquid epoxy mixture, first determining degree of homogeneity in the liquid epoxy mixture;
   concluding desired degree of homogeneity from the first determining or continuing the mixing at least until such time that desired degree of homogeneity is achieved from impinging and determining degree of homogeneity in the liquid epoxy mixture from the fluorescent material fluorescing within the liquid epoxy mixture;
   only after achieving the desired degree of homogeneity from the impinging and determining relative to the liquid epoxy mixture without the liquid epoxy mixture contacting the substrate, applying the liquid epoxy mixture onto the substrate effective to encapsulate the chip and battery within the liquid epoxy mixture on the substrate; and
   after the applying, curing the liquid epoxy mixture into a solid mass which encapsulates the chip and battery.

2. The method of claim 1 wherein the liquid epoxy mixture is substantially void of any liquid material other than the hardener and the resin.

3. The method of claim 1 wherein the liquid resin is substantially void of any fluorescent material.

4. The method of claim 1 wherein the liquid mixture is substantially void of any fluorescent material other than that provided from the liquid hardener.

5. The method of claim 1 wherein the impinging occurs during the mixing.

6. The method of claim 1 wherein the impinging occurs after the mixing.

7. A method of fabricating a remote intelligent communications device comprising:
   providing a substrate having conductive lines formed thereon, the conductive lines comprising an antenna;
   conductively bonding an integrated circuit chip and a battery to the conductive lines on the substrate;
   providing a liquid resin and a liquid hardener, at least one of the liquid resin and the liquid hardener having a fluorescent material therein;
   combining and mixing the liquid resin and the liquid hardener into a liquid epoxy mixture, the liquid epoxy mixture not contacting the substrate during said combining and mixing;
   impinging radiation onto the liquid epoxy mixture effective to cause the fluorescent material within the liquid epoxy mixture to fluoresce within the liquid epoxy mixture, the liquid epoxy mixture not contacting the substrate during said impinging;
   from the fluorescing fluorescent material within the liquid epoxy mixture, first determining degree of homogeneity in the liquid epoxy mixture;
   concluding desired degree of homogeneity from the first determining or continuing the mixing at least until such time that desired degree of homogeneity is achieved from impinging and determining degree of homogeneity in the liquid epoxy mixture from the fluorescent material fluorescing within the liquid epoxy mixture;
   only after achieving the desired degree of homogeneity from the impinging and determining relative to the liquid epoxy mixture without the liquid epoxy mixture contacting the substrate, applying the liquid epoxy mixture onto the substrate effective to encapsulate the chip and battery within the liquid epoxy mixture; and
   after the applying, curing the liquid epoxy mixture into a solid mass which encapsulates the chip and battery.

8. The method of claim 7 wherein the fluorescent material is provided in the hardener.

9. The method of claim 7 wherein the fluorescent material is provided in the resin.

10. The method of claim 7 wherein the fluorescent material is provided in the hardener, and the resin has a greater volume in the liquid epoxy mixture than does the hardener.

11. The method of claim 7 wherein the liquid epoxy mixture is substantially void of any liquid material other than the hardener and the resin.

12. The method of claim 7 wherein the resin has color in light within the visible spectrum.

13. The method of claim 7 wherein the hardener is colorless in light within the visible spectrum.

14. The method of claim 7 wherein the resin has color in light within the visible spectrum, and the hardener is colorless in light within the visible spectrum.

15. The method of claim 7 wherein the impinging occurs during the mixing.

16. The method of claim 7 wherein the impinging occurs after the mixing.

* * * * *

UNITED STATES PATENT AND TRADEMARK OFFICE
CERTIFICATE OF CORRECTION

PATENT NO. : 6,471,129 B2
DATED : October 20, 2002
INVENTOR(S) : Rickie C. Lake

It is certified that error appears in the above-identified patent and that said Letters Patent is hereby corrected as shown below:

<u>Column 5,</u>
Line 24, please replace "support Surface 20." with -- support surface 20. --

Signed and Sealed this

Eighth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,471,129 B2
DATED : October 29, 2002
INVENTOR(S) : Rickie C. Lake

It is certified that error appears in the above-identified patent and that said Letters Patent is hereby corrected as shown below:

<u>Column 2,</u>
Lines 48 and 49, replace "wireless communication devices such and remote intelligent" with -- wireless communication devices such as remote intelligent --

Signed and Sealed this

Twenty-fourth Day of February, 2004

JON W. DUDAS
*Acting Director of the United States Patent and Trademark Office*